United States Patent
El Aziz et al.

(10) Patent No.: US 10,976,755 B2
(45) Date of Patent: Apr. 13, 2021

(54) METHOD AND APPARATUS FOR REGULATING A PLURALITY OF FLUIDS

(71) Applicant: L'Air Liquide, Societe Anonyme pour l'Etude et l'Exploitation des Procedes Georges Claude, Paris (FR)

(72) Inventors: Madiha El Aziz, Charenton le Pont (FR); Alban Pivard, Le Perreux (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 81 days.

(21) Appl. No.: 16/335,452

(22) PCT Filed: Sep. 6, 2017

(86) PCT No.: PCT/FR2017/052363
§ 371 (c)(1),
(2) Date: Mar. 21, 2019

(87) PCT Pub. No.: WO2018/055255
PCT Pub. Date: Mar. 29, 2018

(65) Prior Publication Data
US 2020/0019194 A1  Jan. 16, 2020

(30) Foreign Application Priority Data
Sep. 21, 2016  (FR) ...................... 1658846

(51) Int. Cl.
*G05D 7/06* (2006.01)
*B01D 1/00* (2006.01)
(Continued)

(52) U.S. Cl.
CPC ......... *G05D 7/0664* (2013.01); *B01D 1/0082* (2013.01); *B01D 1/20* (2013.01);
(Continued)

(58) Field of Classification Search
CPC ........ G16B 20/20; G16B 30/00; G16H 10/40; G16H 50/30; G05D 7/0664
See application file for complete search history.

(56) References Cited

U.S. PATENT DOCUMENTS 9,004,107 B2 * 4/2015 Gregor ................. G05D 7/0664
                                                                    137/884
10,698,426 B2 * 6/2020 Ding ......................... G01F 1/36
(Continued)

FOREIGN PATENT DOCUMENTS

EP           1 096 351        5/2001
WO      WO 2012/076786        6/2012

OTHER PUBLICATIONS

International Search Report for and Written Opinion for PCT/FR2017/52363, dated Nov. 26, 2017.

*Primary Examiner* — Vincent H Tran
(74) *Attorney, Agent, or Firm* — Justin K. Murray

(57) ABSTRACT

In a method for regulating at least two fluids, a fluid feed flow Q is divided into n parts, the sum of the n parts being equal to Q, each of the n parts is sent to one of n processing units, each of the n processing units produces at least one processed flow, at least one processed flow of a first of the processing units is regulated by control means in order to keep the flow thereof constant at a value Q1 in nominal operation, at least one processed flow of a second of the processing units is regulated by control means in order to keep the pressure thereof constant in nominal operation and, in the event of a reduction of the feed flow Q, in reduced feed operation, if, preferably only if, the flow of the flow processed in the second processing unit of step v) drops and thus reaches a first minimum flow threshold, a processed flow in the first processing unit is regulated such that the
(Continued)

processed flow having a value Q1 in nominal operation is reduced to a value less than Q1.

9 Claims, 3 Drawing Sheets

(51) Int. Cl.
  *B01D 1/20* (2006.01)
  *B01D 3/42* (2006.01)
  *G05D 11/13* (2006.01)
  *B01D 53/02* (2006.01)

(52) U.S. Cl.
  CPC ............ *B01D 3/42* (2013.01); *G05D 11/132* (2013.01); *B01D 53/02* (2013.01)

(56) References Cited

U.S. PATENT DOCUMENTS

| | | | |
|---|---|---|---|
| 2003/0130807 A1* | 7/2003 | Ambrosina | G01F 1/68 |
| | | | 702/45 |
| 2010/0030390 A1 | 2/2010 | Yamaguchi et al. | |
| 2010/0229967 A1* | 9/2010 | Yasuda | G01F 25/0053 |
| | | | 137/486 |
| 2013/0036833 A1* | 2/2013 | Nakada | G01F 25/0053 |
| | | | 73/861.42 |

* cited by examiner

METHOD AND APPARATUS FOR REGULATING A PLURALITY OF FLUIDS

CROSS REFERENCE TO RELATED APPLICATIONS

This application is a § 371 of International PCT Application PCT/FR2017/052363, filed Sep. 6, 2017, which claims the benefit of FR1658846, filed Sep. 21, 2016, both of which are herein incorporated by reference in their entireties.

FIELD OF THE INVENTION

The present invention relates to a method and to an apparatus for regulating a plurality of fluids.

BACKGROUND OF THE INVENTION

The regulation of a plurality of fluids in parallel, coming from different sources, entails adaptation when:
The balance of substances in terms of flow rate needs to be maintained.
Certain fluids take priority over others, particularly during transient phases, for example if one of the fluids absolutely must be kept within a certain range of flow rates.

SUMMARY OF THE INVENTION

It is sometimes necessary to split a fluid into a plurality of parts in order to treat the parts separately using different treatment methods. The product or products of the treatment methods are then used by one or more clients. If there is a fluctuation in flow rate for a method in which a main source P supplies different treatment units P1 and P2, regulation is performed as follows, as illustrated in FIG. 1:

The flow Q is divided into n (in this instance two) parts, the sum of the parts being equal to Q. Each of the parts 1, 2 is sent to a treatment unit P1, P2 through valves V1, V2. The fluid 11 coming from the unit P1 will be regulated in terms of flow rate by a valve V11, and in this way the flow withdrawn will be at a fixed rate and the fluid 12 coming from the unit P2 will be controlled in terms of pressure by the valve V12 with a view to keeping the balance of substances stable. (FIG. 1). The treatment unit P1 may produce products other than 11. The treatment unit P2 may produce products other than 12. The valve V11 regulates the flow rate of the product 21 in order to produce a constant flow rate Q1 that takes account only of the flow rate of the flow 11 coming from the method P1 by means of a controller FIC. The pressure of the product 21 can vary. The valve V12 regulates the pressure of the product 12 so that this pressure is constant, using a controller PIC, the flow rate Q2 of the product 22 potentially varying. The regulation takes account only of the flow rate of the flow 12 coming from the method P2.

The treatment units may operate the same treatment system, for example adsorption, distillation, absorption, etc., or else may each operate according to a different treatment system.

One aspect of the invention provides a method for regulating at least two fluids, in which:
i) A fluid supply flow Q is divided into n parts, the sum of the n parts being equal to Q.
ii) Each of the n parts is sent to one of n treatment units.
iii) Each of the n treatment units produces at least one treated flow.
iv) At least one treated flow from a first of the treatment units is regulated by control means in order to keep its flow rate constant at a value Q1 in nominal operation.
v) At least one treated flow from a second of the treatment units is regulated by control means in order to keep its pressure constant in nominal operation.
vi) In the event of a reduction in the supply flow rate Q, in reduced-supply operation, if, and preferably only if, the flow rate of the flow treated in the second treatment unit of step v) drops and thus reaches a first minimum flow rate threshold, a flow treated in the first treatment unit is regulated so that the treated flow which in nominal operation has a flow rate Q1 is reduced to a flow rate lower than Q1.

According to other optional aspects:
n is equal to 2.
n is equal to at least 3.
the treated flow from a first of the treatment units, regulated by control means in order to keep its flow rate constant at a value Q1 in nominal operation, is not regulated to keep its pressure constant in nominal operation.
the treated flow from a second of the treatment units, regulated by control means in order to keep its pressure constant in nominal operation, is not regulated to keep its flow rate constant in nominal operation.
the first unit produces two treated flows, each of the two being regulated by control means in order to keep its flow rate constant.
in the event of a reduction in the fluid flow rate Q, if, and preferably only if, the flow rate of the flow treated in the second treatment unit of step v) drops below a threshold, just one flow treated in the first treatment unit is regulated to reduce its flow rate to a flow rate lower than Q1.
the first treatment unit is a treatment unit performing adsorption and/or distillation, potentially cryogenic distillation.
the second treatment unit is a treatment unit performing adsorption and/or distillation, potentially cryogenic distillation.

Another aspect of the invention provides an apparatus for regulating at least two fluids, comprising:
a) Means for dividing a fluid supply flow Q into n parts, the sum of the n parts being equal to Q
b) Means for sending each of the n parts to one of n treatment units
c) Means for extracting at least one treated flow from each of the n treatment units d) Means for regulating flow rate in order to keep the flow rate of at least one treated flow from a first of the treatment units constant so as to keep its flow rate constant at a flow rate Q1 in nominal operation
e) Means for regulating pressure in order to keep the pressure of at least one treated flow from a second of the treatment units constant in nominal operation, and
f) Means for detecting the reduction in the flow rate of the flow treated in e), these detection means being capable of reducing the flow rate of a treated flow coming from the first of the treatment units when the flow treated in e) reaches a minimum flow rate threshold, so as to reduce the flow rate of a treated flow coming from the first of the treatment units to a flow rate lower than Q1.

According to other optional aspects:
the means for detecting the reduction in flow rate of the treated flow are capable of acting in such a way as to reduce the flow rate of the treated flow coming from the first of the treatment units to a flow rate lower than Q1 by reducing the flow rate of this flow coming from the first of the treatment units.

the means for detecting the reduction in flow rate of the treated flow are capable of acting in such a way as to reduce the flow rate of the treated flow coming from the first of the treatment units to a flow rate lower than Q1 by reducing the flow rate of another flow coming from the first of the treatment units.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

DETAILED DESCRIPTION OF THE INVENTION

Figure 1:
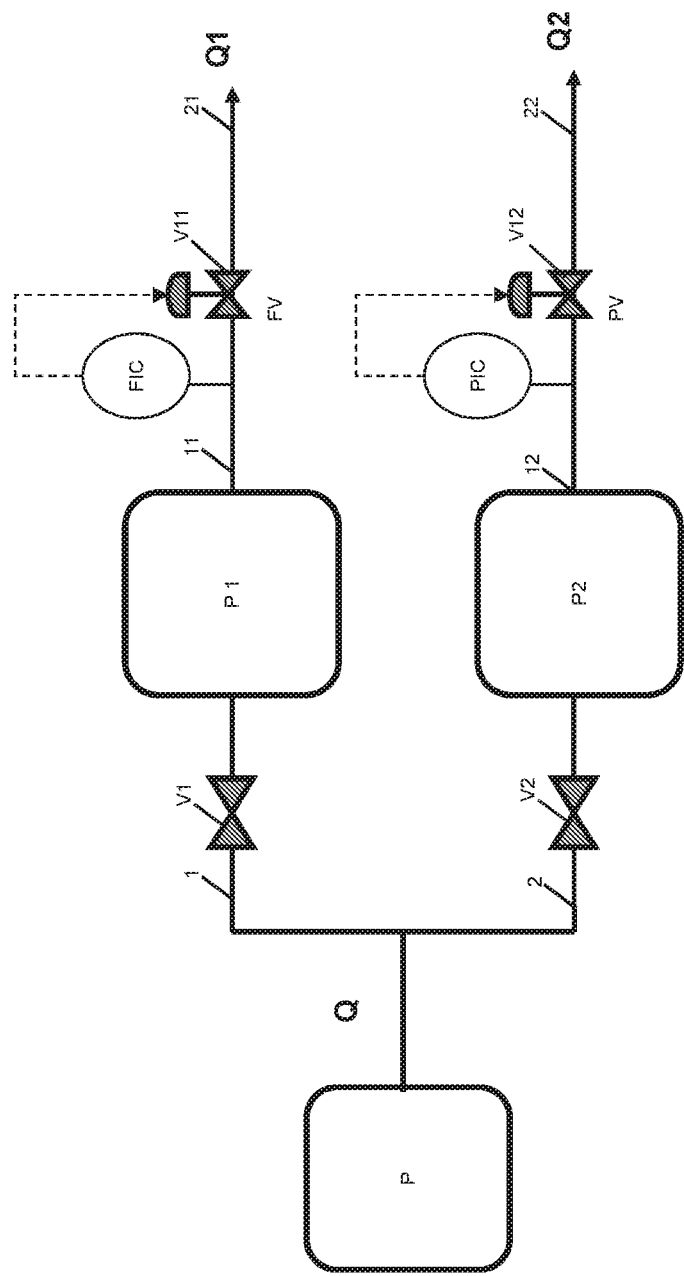
FIG. 1 provides a first embodiment of the present invention.

In FIG. 1, the flow Q coming from a common source P is divided into n (in this instance two) parts, the sum of the parts being equal to Q. Each of the parts 1, 2 is sent to a treatment unit P1, P2 through valves V1, V2. The fluid 11 coming from the unit P1 will be regulated in terms of flow rate by a valve V11, and in this way the flow withdrawn will be at a fixed flow rate and the fluid 12 coming from the unit P2 will be controlled in terms of pressure by the valve V12 with a view to keeping the balance of substances stable. The treatment unit P1 may produce products other than 11. The treatment unit P2 may produce products other than 12. The valve V11 regulates the flow rate of the product 21 in order to produce a constant flow rate Q1. The pressure of the product 21 can vary. The valve V12 regulates the pressure of the product 12 so that this pressure is constant, using a controller PIC, the flow rate Q2 of the product 22 potentially varying. The regulation takes account only of the flow rate of the flow 12 coming from the method P2.

The treatment units may operate the same treatment system, for example adsorption, distillation, absorption, etc., or else may each operate according to a different treatment system.

Figure 2:
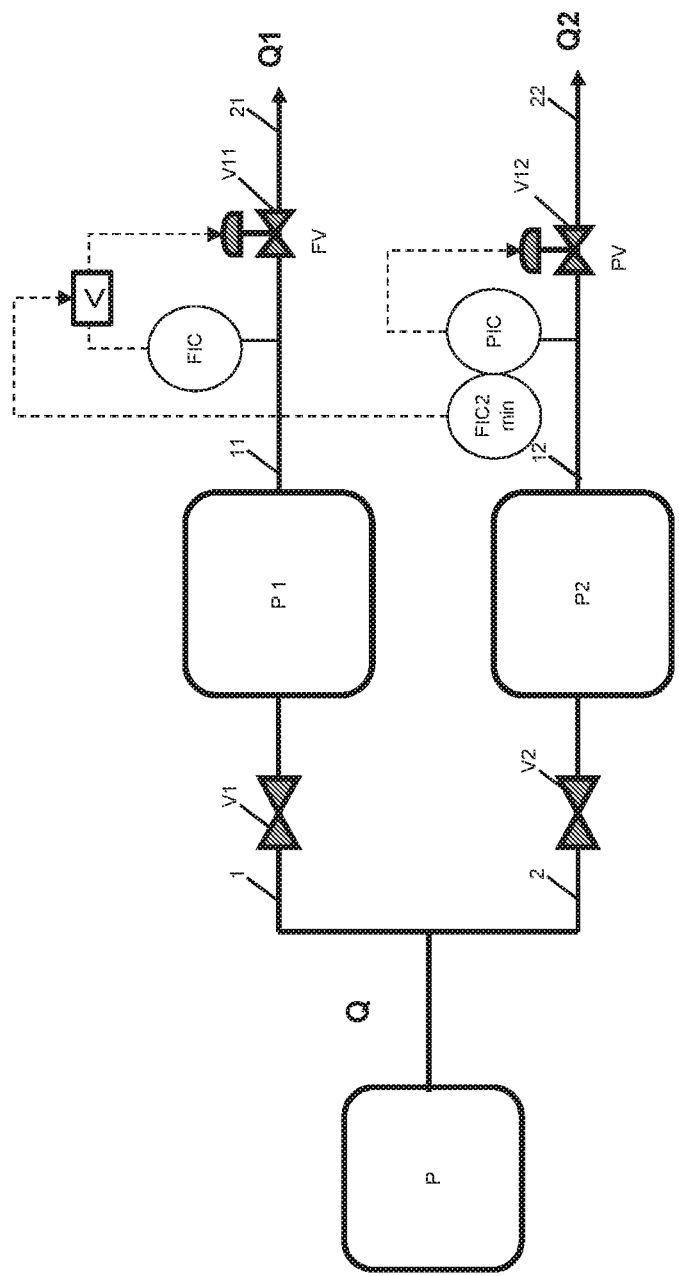
FIG. 2 provides a second embodiment of the present invention.

Considering an alternative form of FIG. 1, if there is a difference in the priority of production of the flows of the final products, the regulation will be adapted as follows, as illustrated in FIG. 2:

The fluid 21 coming from the unit P1 will still be regulated in terms of flow rate in order to keep this flow rate constant when possible, and the fluid 12 coming from the unit P2 will be regulated in terms of pressure with a view to keeping the balance of substances stable. If the flow rate of the fluid 21 needs to be stable whatever the operating scenario as far as possible, and if the second product 22 absolutely must not drop below a certain flow rate because such a drop would cause the method P2 to halt, it is clear that the needs of the consumer of the flow 22 take priority over those of the consumer of the flow 21. The consumer needs to be able to receive the product 22 when the supply Q is low even if, in order to do so, it is necessary to lower the production of the product 21. To this end, a controller FIC2min will be added to the valve V11 that regulates the pressure of the fluid 22. Using this control loop, the FIC2min will always maintain a minimal flow rate through the method P2. A low-pass device will keep the flow 21 at the constant flow rate Q1, as long as doing so remains possible. However, when the minimum threshold for 12 is reached, the FIC2min will lower the flow rate of 11 in order, as a priority, to keep the flow 22 at a minimum flow rate threshold.

For example, let us consider a system in which the flow 21 is sent to a client which defines the flow rate Q1 it needs. The flow 22 is sent to another client, for which the flow rate is unimportant (supplying a network or method downstream which is able to tolerate fluctuations in flow rate, etc.).

The method P2 requires a minimum supply flow rate which corresponds to a flow rate of product 22 of 80 $Nm^3/h$ in order to function.

In normal operation, the two methods P1, P2 produce productions 21, 22 of 100 $Nm^3/h$ each, which in the case of the flow 21 corresponds to the desired flow rate Q1.

If the supply flow rate drops, initially, it is still possible to meet the needs of the two clients and the method P1 produces a flow rate of 100 $Nm^3/h$ of the flow 21 whereas the method P2 contents itself with producing 80 $Nm^3/h$ of the flow 22, which corresponds to the minimum production.

If the supply flow rate drops further, it is no longer possible to produce 100 $Nm^3/h$ of the flow 21 and at the same time operate the method P2, because the flow rate of the flow 12 would drop below the minimum of 80 $Nm^3/h$.

In that case, the controller lowers the flow rate of the flow 21 to a flow rate of 90 $Nm^3/h$, which is therefore below 100 $Nm^3/h$ (Q1). By contrast, the flow produced by the method P2 is kept at a flow rate of 80 $Nm^3/h$.

Thus it is possible to keep P2 functioning by limiting the supply to the Q1 client, entirely automatically.

Without this control, P2 would have tripped or functioned incorrectly, leading to a halt in the production of Q2. In this instance, the clients for Q1 and Q2 continue to be supplied even though the Q1 client no longer receives the anticipated flow rate.

In another application of this idea, P1 and P2 are methods which are identical, but which experience a rapid degradation in performance when they are not operating at their nominal flow rates. Rather than having two units operating far from their optima, in this instance, P1 is kept at its optimum.

In another application, the source P of the flow Q is made up of two units the operations of which can vary from 60 to 100. This source supplies four methods the operations of which vary from 30 to 20. If both sources are available, then Q(unit1)=Q(unit2)=60 and Q1=Q2=Q3=Q4=30. If Q (unit2) trips out, then Q(unit1) will increase its load to 100 and P1=P2=30 in order to maintain their optima, and P3=P4=20 in order to keep these units in operation.

Figure 3:
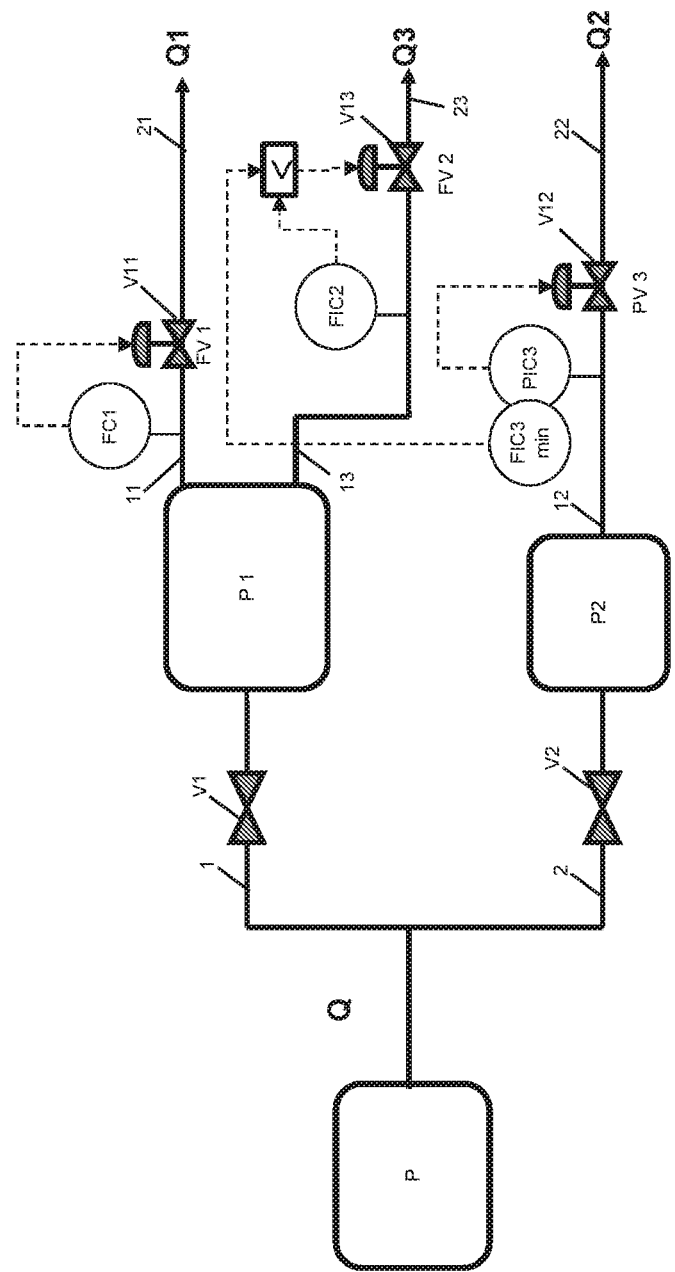
FIG. 3 provides a third embodiment of the present invention.

The regulation control described hereinabove is valid whatever the number of fluids (n fluids). FIG. 3 depicts an example of three fluids 11, 12, 13 produced by two treatment units P1, P2: the fluids 11, 13 being produced by P1, and the fluid 12 by P2. The fluids 11, 13, 12 are regulated by the valves V11, V12, V13 to produce the fluids 21, 23, 22 with flow rates Q1, Q3, Q2 respectively.

The fluid 11 needs to be stable whatever the state of operation so that the flow rate of 21 downstream of the valve V11 remains equal to Q1. The fluid 22 will be used to establish the balance of substances as long as the fluid 22 has not reached its minimum flow rate. Thus, if the flow rate of 22 reaches a minimum threshold, the flow rate of the flow 13, 23 produced by the method P1 will be lowered while the flow rate of 11, 21 will remain constant.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for regulating at least two fluids, the method comprising the steps of:
   i) dividing a fluid supply flow Q into n parts, the sum of the n parts being equal to Q;
   ii) sending each of the n parts to one of n treatment units;
   iii) producing at least one treated flow in each of the n treatment units;
   iv) regulating at least one treated flow from a first treatment unit in order to keep a flow rate of the at least one treated flow constant at a value Q1 in nominal operation;
   v) regulating at least one treated flow from a second treatment unit in order to keep a pressure of the at least one treated flow constant in nominal operation;
   wherein, in the event of a reduction in the fluid supply flow Q, in reduced-supply operation, if the flow rate of the treated flow in the second treatment unit of step v) drops and reaches a first minimum flow rate threshold, a flow treated in the first treatment unit is regulated so that the treated flow which in nominal operation has a flow rate Q1 is reduced to a flow rate lower than Q1,
   wherein the first treatment unit produces two treated flows, each of the two treated flows being regulated in order to keep the respective flow rates constant,
   wherein in the event of a reduction in the fluid flow rate Q, if the flow rate of the flow treated in the second treatment unit of step v) drops below a threshold, just one flow treated in the first treatment unit is regulated to reduce its flow rate to a flow rate lower than Q1.

2. The method as claimed in claim 1, in which n is equal to 2.

3. The method as claimed in claim 1, in which n is equal to at least 3.

4. The method as claimed in claim 1, in which the first treatment unit is a treatment unit performing adsorption and/or distillation.

5. The method as claimed in claim 1, in which the second treatment unit is a treatment unit performing adsorption and/or distillation.

6. An apparatus for regulating at least two fluids, the apparatus comprising:
   i) means for dividing a fluid supply flow Q into n parts, the sum of the n parts being equal to Q;
   ii) means for sending each of the n parts to one of n treatment units;
   iii) means for extracting at least one treated flow from each of the n treatment units;
   iv) means for regulating flow rate in order to keep the flow rate of at least one treated flow from a first of the treatment units constant so as to keep its flow rate constant at a flow rate Q1 in nominal operation;
   v) means for regulating pressure in order to keep the pressure of at least one treated flow from a second of the treatment units constant in nominal operation; and
   vi) means for detecting the reduction in the flow rate of the flow treated in v), these detection means being capable of reducing the flow rate of a or of the treated flow coming from the first of the treatment units when the flow treated in v) reaches a minimum flow rate threshold, so as to reduce the flow rate of a treated flow coming from the first of the treatment units to a flow rate lower than Q1,
   where the first treatment unit is configured to produce two treated flows, each of the two treated flows being regulated in order to keep the respective flow rates constant,
   wherein in the event of a reduction in the fluid flow rate Q, if the flow rate of the flow treated in the second treatment unit of step v) drops below a threshold, the apparatus is further configured to regulate just one flow treated in the first treatment unit to reduce its flow rate to a flow rate lower than Q1.

7. The apparatus as claimed in claim 6, wherein the means for detecting the reduction in flow rate of the treated flow are capable of acting in such a way as to reduce the flow rate of the treated flow coming from the first of the treatment units to a flow rate lower than Q1 by reducing the flow rate of this flow coming from the first of the treatment units.

8. The apparatus as claimed in claim 6, wherein the means for detecting the reduction in flow rate of the treated flow are capable of acting in such a way as to reduce the flow rate of the treated flow coming from the first of the treatment units to a flow rate lower than Q1 by reducing the flow rate of another flow coming from the first of the treatment units.

9. The apparatus as claimed in claim 6, wherein the first treatment unit and/or the second treatment unit is an adsorption, distillation or absorption apparatus.

* * * * *